QUICK STOP ARRANGEMENT FOR A TAPE RECORDER REPRODUCER

Filed July 8, 1964 3 Sheets-Sheet 1

INVENTOR.
FRIEDRICH LOUZIL
BY
Frank R Trifari
AGENT

INVENTOR.
FRIEDRICH LOUZIL
BY
Frank R. Trifari
AGENT

INVENTOR.
FRIEDRICH LOUZIL
BY
Frank R. Trifari
AGENT

United States Patent Office 3,282,522
Patented Nov. 1, 1966

3,282,522
QUICK STOP ARRANGEMENT FOR A TAPE RECORDER/REPRODUCER

Friedrich Louzil, Vienna, Austria, assignor to North American Philips Company, Inc., New York, N.Y., a corporation of Delaware Filed July 8, 1964, Ser. No. 381,152
Claims priority, application Austria, July 16, 1963, A 5,678/63
6 Claims. (Cl. 242—55.12)

Recording and/or reproducing apparatus are often provided with a so-called quick-stop key, i.e. a control-member which permits instantaneously interrupting movement of a record carrier and of restating it respectively. The advantage of such a device as is known, in that it is not necessary for the capstan drive to be switched off but that only certain parts are put out of operation. Such a device has heretofore quick response.

The present invention relates to a device for the instantaneous interruption of the movement of a tape by the means of a separate control-member in the form of a quick-stop key in recording and/or reproducing apparatus, in which the tape coming from a supply spool is driven by a driving shaft, against which the tape is urged, in its operating condition, by a pressure roller arranged on an adjustable support, which roller is lifted by means of the control-member for abrupt interruption of the tape movement.

In accordance with the invention the support is adjustable via one or more transmission members by means of an electro-magnet, one of the transmission members having rotatably fastened to it a lever, which co-operates with a brake for the support of the supply spool and furthermore provision is made of a supporting member for said lever, which supporting member is adjustable by said control member and which, when the electro-magnet is energized, the control-member, applies the brake and lifts the pressure roller from the driving shaft or capstan.

The advantage of the device according to the invention resides not only in its structural simplicity but also in that the electro-magnet remains energized, when the control member (quick-stop key) is actuated. As compared with a conventional stop key, with which the electro-magnet is de-energized, the quick-stop key lifts the armature of the magnet and the pressure roller only a small amount from the magnet core and from the driving shaft respectively. For regaining its operational position, the pressure roller need cover only a small distance, the full power of the electro-magnet being immediately available, so that this operation takes a minimum of time.

Since in the device according to the invention the electro-magnet remains energized, this device is particularly advantageous for application in apparatus in which the electro-magnet in the operating condition which the tape travels at normal speed serves not only for actuating the pressure roller but also for other functions in the same operating condition, for example for actuating main brakes, for switching on a slip coupling for driving the winding-up reel and so on.

The invention will be described hereinafter more detailed by way of example with reference to embodiments shown in the drawing, and without restricting the scope of the invention to these embodiments.

The drawing shows diagrammatically various devices according to the invention. Only those parts are shown, which directly relate to the invention.

Corresponding part or parts having corresponding functions are designated in the figures by the same reference numerals.

Figures 1, 2, 3:
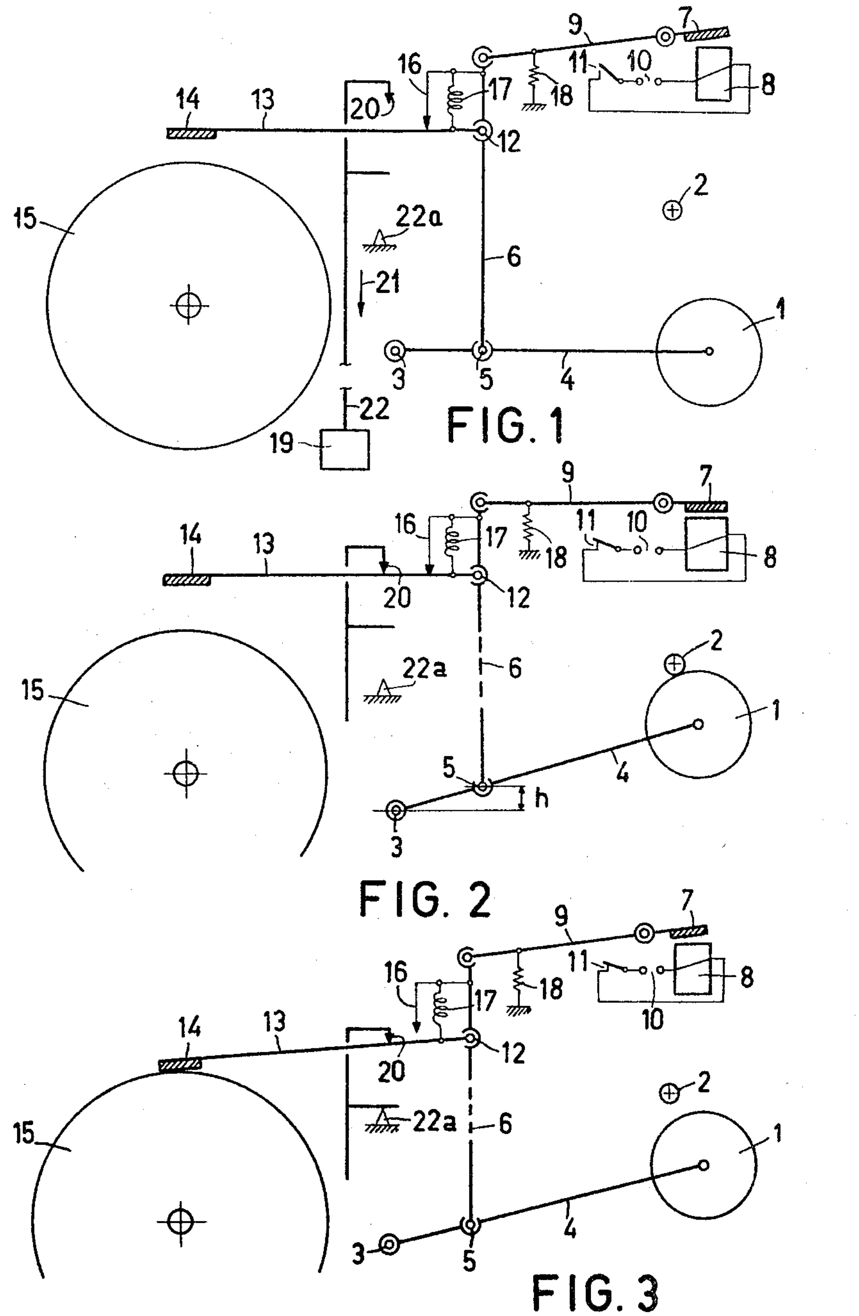
FIGS. 1, 4 and 5 are diagrammatic views which show devices in which for the supply spool a separate brake is provided to be actuated by a quick stop-key. These three figures show the positions of the parts in the non-actuated state of the quick-stop key, when the electro-magnet is not energized (pressure roller is free of the driving shaft).
FIGS. 2 and 3 are diagrammatic views which show for the device of FIG. 1 the positions of the parts when the quick-stop key is not actuated and the electro-magnet is energized (pressure roller is in contact with the driving shaft) and when the quick-stop key is actuated and the electro-magnet is energized respectively.

In the device shown in the figures the pressure roller 1 which has to be pressed against the capstan 2, is arranged on a lever 4, adapted to turn in a bearing 3. The lever is turned with the aid of a connecting rod 6, fastened to the lever 4 at the pivotal point 5. The movement of the armature 7 of an electro-magnet 8 is transferred to rod 6 by means of a lever 9. The current circuit of the electro-magnet 8 includes a current source 10 and a working contact 11, which is closed by a control-member (not shown) and which, when closed, switches on the tape drive, thereby performing, together with the urging of the pressure roller 1 against the driving shaft 2, the further mechanical and electrical operations required for attaining the corresponding operating condition, for example switching on the drive of a take-up spool and lifting various brakes. The connecting rod 6 carries at 12 a lever 13, which is provided with a brake 14, said brake is actuated by turning the lever 13 against the periphery of the flywheel 15 of the supply spool. The lever 13 extends transverse in respect of the rod 6 and is held in this position by a stop 16 and a spring 17. Thus the lever 13 can be turned only to that side where the brake 14 is provided. A spring 18 determines the rest position of the whole system, when the magnet 8 is not energized (working contact 11 is open).

The quick-stop key 19 is connected through a pull connection 22 (FIGS. 1, 4 and 6) or a push connection 23 (FIG. 5) (rod or wire or the like) with a support 20, for example a hook. When the key 19 is actuated, the support 20 is shifted in the direction of the arrow 21 and arrives at the lever 13. A stop 22*a* limits the possibility of movement of the quick-stop key 19.

As stated above, FIG. 1 shows the device in the rest position, i.e. the pressure roller is lifted and the quick-stop key is not actuated.

In order that the pressure roller 1, when the magnet 8 is energized, is urged against the driving shaft 2, so that the operation position of FIG. 2 is obtained, the connecting rod 6 must shift with the pivotal points 5 and 12 over a distance $h$. The lever 9 can be given easily such dimensions that the complete stroke of the armature 7 corresponds to a displacement of the rod 6 over said distance $h$. The lever 13 can follow the displacement of the rod 6 in carrying out a translation movement as long as the quick-stop key 19 is not actuated (FIG. 2). It is not necessary for the support 20 to allow, when the quick-stop key is not actuated, a translation movement of the lever 13. The lever 13 can come into contact with the support 20, when the armature is lifted, and can thus be rotated. It is only essential that the lever 13 should be pivoted to an extent such that the brake 14 does just not become operative.

When, in the operating position, (FIG. 2) the quick-stop key is actuated, the lever 13 is first pivoted around the fulcrum 12 under the pressure of the support 20 to an extent such that the brake 14 engages the periphery of the flywheel 15, after which the lever 13 is rotated further with the brake 14 as a fulcrum until the support 20 has reached the final position determined by the stop 22*a*. The rod 6 is carried over part of the distance *h* against the force of the magnet 8 so that the pressure roller 1 is just lifted from the driving shaft 2 (FIG. 3). The armature 7 of the electro-magnet 8 is lifted only over a small distance from the magnet core owing to the transmission ratio of the leverage 4, 6, 9. When the key 19 is released, i.e. when the pressure roller is brought again in contact with the driving shaft 2, the pressure roller need move only over a small distance and to this end the full force of the electro-magnet is immediately available, so that this operation is carried out with minimum time.

Figures 4, 5:
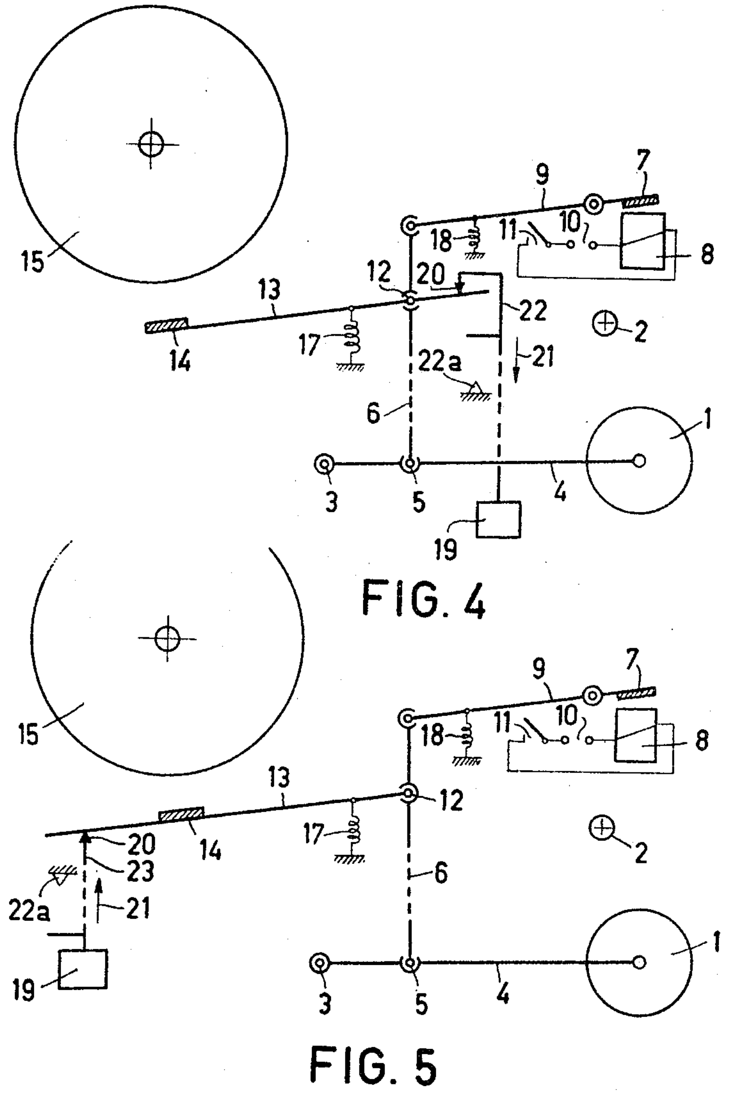

The device may be varied conveniently in different ways. In the device shown in FIG. 4 the lever 13 is formed by a two-armed lever or first class lever. In the device shown in FIG. 5 the quickstop key 19 acts on the support 20 via the push-rod 23. In both cases the stop 16 (FIGS. 1–3) is omitted. The effect of the spring 17 on the lever 13 is thus limited by the support 20. Also the device shown in FIG. 1 can be carried out in this way. As stated above, FIGS. 4 and 5 show the positions of the parts, when the electro-magnet is de-energized and the quick-stop key is not actuated.

Figure 6:
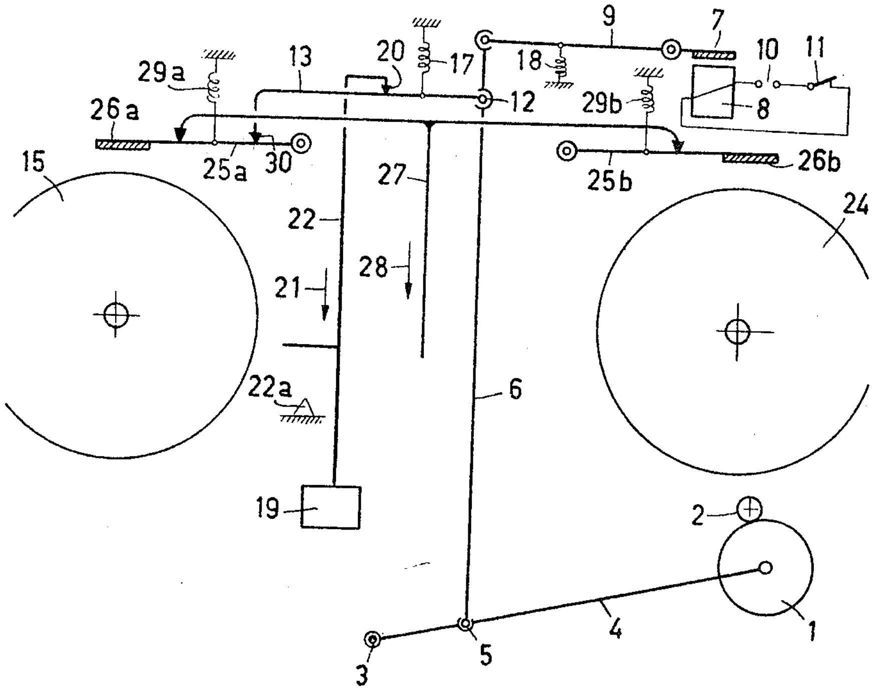
FIG. 6 shows a device in which a quick-stop brake is provided in a main brake system, braking the supply spool when switching over to a different operating condition or for stopping the travel of the tape.

In the device shown in FIG. 6 one-armed levers 25*a* and 25*b* are provided as brakes for the flywheels 15 and 24 of a supply spool and a take-up spool respectively, the ends of said levers being provided with brake coatings 26*a* and 26*b* respectively. The brakes are actuated by means of a T-shaped operating member 27, which is drawn in the direction of the arrow 28 by an associated control-member (not shown), when the tape movement is stopped. When the operating member 27 is shifted back, i.e. when the tape movement is switched on, the springs 29*a* and 29*b* release the brakes. This position is shown in FIG. 6 for the forward travel with normal speed of the tape. The magnet 8 is then energized and the pressure roller 1 engages the driving shaft 2. The lever 13, as in the other embodiments, is actuated by means of the support 20 of the quick-stop key 19 (shown in FIG. 6 in its rest position) and acts with its free end 30 on the lever 25*a* When the quick-stop key 19 is actuated, first the lever 13 and then the lever 25*a* are turned. When the coating 26*a* engages the flywheel 15, the end 30 of the lever 13 is fixed and a further movement of the support 20 in the direction of the arrow 21 results in a turn of the lever 13 about the fulcrum 30 and hence the pressure roller is lifted from the driving shaft 2.

What is claimed is:

1. A quick stop arrangement for a tape recorder/reproducer having a tape supply means, a capstan and associated pressure roller for driving the tape of said recorder/reproducer, comprising a first means moveably supporting said pressure roller, a brake for engaging said tape supply means, a second means for moveably supporting said brake, a moveable member connected with said first means and pivotally connected with said second means, an energy source and means interconnecting said source and said movable member for imparting a first movement thereto whereby said brake is released and the tape is driven, a quick stop manually operated key means, said key means being connected with said second means for pivoting said second means relative to said moveable member, and substantially simultaneously moving said moveable member for separating said pressure roller and said capstan.

2. A quick stop arrangement for a tape recorder/reproducer according to claim 1 wherein said second means comprises a first lever having a brake material attached to one end, a fixed pivot means connected with the other end of said lever, a second lever engaging said first lever for moving said brake into brake applied position, and said second lever being pivotally connected with said moveable member.

3. A quick stop arrangement according to claim 1 with the addition of an adjustable stop coupled with said second means for determining the angular position of said second means relative to said moveable member.

4. A quick release arrangement for a recorder/reproducer having a tape supply means comprising a capstan and pressure roller for driving the tape of said recorder/reproducer, a first pivotal lever connected with said pressure roller, a brake means operatively connected with said tape supply means, a second pivotal lever connected with said brake menas, an energy source including a shiftable connecting rod, said first and second levers being pivotally connected with said connecting rod for applying said brake and separating said pressure roller and capstan upon movement of said connecting rod in one direction of movement thereof and vice versa in the opposite direction of movement of said connecting rod; and a quick stop means comprising a moveable member operatively connected with said second lever for sequentially pivoting said second lever relative to said rod for applying said brake means and pivoting said lever about said brake means for moving said rod for separating said pressure roller and capstan.

5. A quick release arrangement for a recorder/reproducer according to claim 4 wherein said second lever comprises a first class lever pivotally connected with said rod at the fulcrum and having said brake means at on end, the other end of said lever being operatively connected with said moveable member.

6. A quick release arrangement for a recorder/reproducer according to claim 4 wherein said brake means comprising a third lever fixed at one end for pivotal movement and having a brake band fixed to the other end, said second lever being operatively connected with said third lever between said ends.

References Cited by the Examiner

UNITED STATES PATENTS

| | | | |
|---|---|---|---|
| 2,845,230 | 7/1958 | Rhoades ________ | 242—55.12 |
| 2,937,817 | 5/1960 | Loewe et al. ______ | 242—55.12 |

FRANK J. COHEN, *Primary Examiner.*

LEONARD D. CHRISTIAN, *Examiner.*